United States Patent
Taitel et al.

(10) Patent No.: US 8,631,013 B2
(45) Date of Patent: Jan. 14, 2014

(54) NON-INTRUSIVE DATA LOGGING

(75) Inventors: Howard Taitel, Sudbury, MA (US);
Michael Kositsky, Shrewsbury, MA (US)

(73) Assignee: The MathWorks, Inc., Natick, MA (US)

( * ) Notice: Subject to any disclaimer, the term of this patent is extended or adjusted under 35 U.S.C. 154(b) by 227 days.

(21) Appl. No.: 13/238,714

(22) Filed: Sep. 21, 2011

(65) Prior Publication Data

US 2012/0072399 A1    Mar. 22, 2012

Related U.S. Application Data (63) Continuation-in-part of application No. 13/023,190, filed on Feb. 8, 2011, now abandoned, which is a continuation of application No. 11/841,960, filed on Aug. 20, 2007, now Pat. No. 7,890,542, which is a continuation of application No. 10/417,397, filed on Apr. 16, 2003, now Pat. No. 7,512,613.

(51) Int. Cl.
*G06F 17/30*    (2006.01)

(52) U.S. Cl.
USPC .......................................... 707/741; 707/802

(58) Field of Classification Search
USPC ............... 707/741, 802, 805, 999.101; 703/1; 717/135
See application file for complete search history.

(56) References Cited

U.S. PATENT DOCUMENTS

| | | | |
|---|---|---|---|
| 6,728,879 B1 | 4/2004 | Atkinson | |
| 6,823,349 B1 | 11/2004 | Taylor et al. | |
| 7,337,430 B2 | 2/2008 | Aberg | |
| 7,512,613 B2 | 3/2009 | Taitel | |
| 7,890,542 B1 | 2/2011 | Taitel | |
| 2001/0054091 A1 | 12/2001 | Lenz et al. | |
| 2003/0195735 A1 | 10/2003 | Rosedale et al. | |
| 2004/0100502 A1 | 5/2004 | Ren | |
| 2004/0117460 A1 | 6/2004 | Walsh et al. | |
| 2005/0138083 A1 | 6/2005 | Smith-Semedo et al. | |

*Primary Examiner* — Cheryl Lewis
(74) *Attorney, Agent, or Firm* — Nelson Mullins Riley & Scarborough LLP (57) ABSTRACT

Mediums, methods, and systems are provided for efficiently logging data. A model may include one or more logging points which process data, the data being stored in a log associated with the logging point. The logging point may request that a logging object store the data point. The logging object may include a reference to a vector for storing the data point. When two or more logging objects are associated with the same logged data points, the two or more logging objects may share the same vector. If an object logs a point which is not present in a shared vector, the object may update the object's reference so that the object references a different existing vector, or the object may create a new vector. The vectors may be compressed and/or made circular to achieve improved efficiency.

24 Claims, 8 Drawing Sheets

NON-INTRUSIVE DATA LOGGING

RELATED APPLICATIONS

This application is a continuation-in-part of, and claims priority to, U.S. patent application Ser. No. 13/023,190, abandoned filed Feb. 8, 2011 and entitled "Non-Intrusive Data Logging," which is a continuation of U.S. patent application Ser. No. 11/841,960, filed Aug. 20, 2007, issued as U.S. Pat. No. 7,890,542, which is a continuation of U.S. application Ser. No. 10/417,397, filed Apr. 16, 2003, issued as U.S. Pat. No. 7,512,613. The contents of the aforementioned applications are incorporated herein by reference.

BACKGROUND

Data may be generated or processed by hardware devices or software programs. In some circumstances the data is stored or logged for future use. For example, data may be stored or logged by writing the data to a persistent storage medium. A collection of stored data points may be referred to as a data log.

Multiple hardware devices or multiple software entities may create or process related data points that are logged together. For example, consider an airplane with a number of sensors that monitor the state of the airplane during operation. It may be helpful to log the output of the sensors so that the output can be subsequently reviewed, for example, during post-flight maintenance or in case of a mishap. Each sensor may generate multiple data points to be stored in a log associated with the sensor, and multiple logs may be created (for example, one for each sensor). Accordingly, it may be necessary to store multiple data logs with each data log containing large amounts of data.

SUMMARY

Computer-implemented methods, mediums, and systems are described herein for creating and sharing data logs amongst logging points. Data logs may be shared by associating logging objects with the logging points and associating logging vectors with the logging objects. Different logging objects may point to the same logging vector in order to allow the data logs to be shared.

Accordingly, a first object may be created. The first object may interact with a first logging location in an arbitrary model in the environment. The arbitrary model may be, for example, a block diagram model of a dynamic system.

The first object may include a first reference, such as a pointer, and a first counter for indexing into a vector. The first object may create a first vector having a first data point. The data may be, for example, time data that indicates at what time a certain event occurred.

A second object may also be created. The second object may interact with a second logging point in the arbitrary model. The second object may include a second reference and a second counter for indexing into a vector.

If the second object shares at least the first data point in the first vector with the first object, then the second object's counter may be used to reflect the number of elements into the first vector which the second object shares with the first object. If the second object does not share the first data point with the first object, then a second vector may be created, and the second object may index into the second vector.

The vectors may store the data in a compressed or circular format. Initially, the vectors may store uniform data and may compress the uniform data. If non-uniform data is received at an object associated with a compressed uniform vector, then the vector may be changed into an uncompressed vector. The vector may also be associated with a threshold describing the maximum number of data points that may be stored in the vector. If the threshold is exceeded, the vector, which is initially a linear vector storing each data point, may be changed into a circular vector which overwrites the oldest data points in the vector.

DETAILED DESCRIPTION

In exemplary embodiments, data logs may be shared in real time or near-real-time without the processing overhead associated with conventional techniques.

Exemplary embodiments may provide a data logging infrastructure for efficiently logging data from a variety of sources. A model may include one or more logging points that process data. Logging points are locations in the model that create or process data and request that the data be stored in a data log.

The data may be stored in logs associated with the logging points. Each logging point may request that a logging object store a data point of the data. The logging object may include a reference to a data vector for storing the data point. When two or more logging objects are associated with the same logged data points, the two or more logging objects may share the same vector. If an object logs a point that is not present in a shared vector, the object may update its reference so that the object references a different existing vector, or the object may create a new vector. The vectors may be compressed and/or made circular to achieve improved efficiency.

Exemplary embodiments may include one or more object classes and support mechanisms that may be manifested in a programming language, such as Java, C++, or MATLAB of The MathWorks, Inc. of Natick, Mass. In some embodiments, the logging objects, data vectors, and vector collections described herein may be provided as part of a technical computing environment, such as the Simulink environment (also of The MathWorks, Inc.).

Data logs may often be repetitive with respect to each other. For example, multiple redundant sensors may be in place in case one of the sensors fails. Further, sensors that are spatially close together or that monitor similar aspects of an entity's performance may generate very similar data points. In some situations, logging points may log time data—that is, the logging points may log the time at which an event may occur. In the case of events affecting multiple logging points, much repetitive logging data may be generated.

In conventional systems, one of two techniques for logging data are used. First, either each logging point is associated with a unique data log (which may result in multiple copies of repetitive logs), or second, the data logs may be processed after data logging is complete to determine which data logs can be shared or eliminated. This second conventional technique is also not able to share logs in real time or near-real-time, which may be useful when the data is provided in the form of a stream.

Further, conventional data logging solutions have typically been implemented on a case-by-case basis. That is, a data logging solution that is compatible with one software environment or hardware device may not be compatible with another software environment or hardware device. Accordingly, a significant amount of customization may be required to ensure that a data logging solution is efficient and effective for a particular data logging situation.

In contrast, exemplary embodiments allow data logging to be achieved with respect to arbitrary input sources, such as an arbitrary model. That is, the data logging techniques described herein are agnostic as to where the logged data originates. The data logging techniques described herein can be carried out regardless of what type of model or environment requests that the data be logged. This is possible in part because only the values to be logged need to be passed to the logging infrastructure.

Exemplary embodiments utilize logging objects to store data in a data vector. The logging objects may receive requests from logging points in an arbitrary model to log a particular unit of data. The request may be as simple as providing a data value from a logging point to a logging object associated with the logging point.

Figures 1A, 1B, 1C:
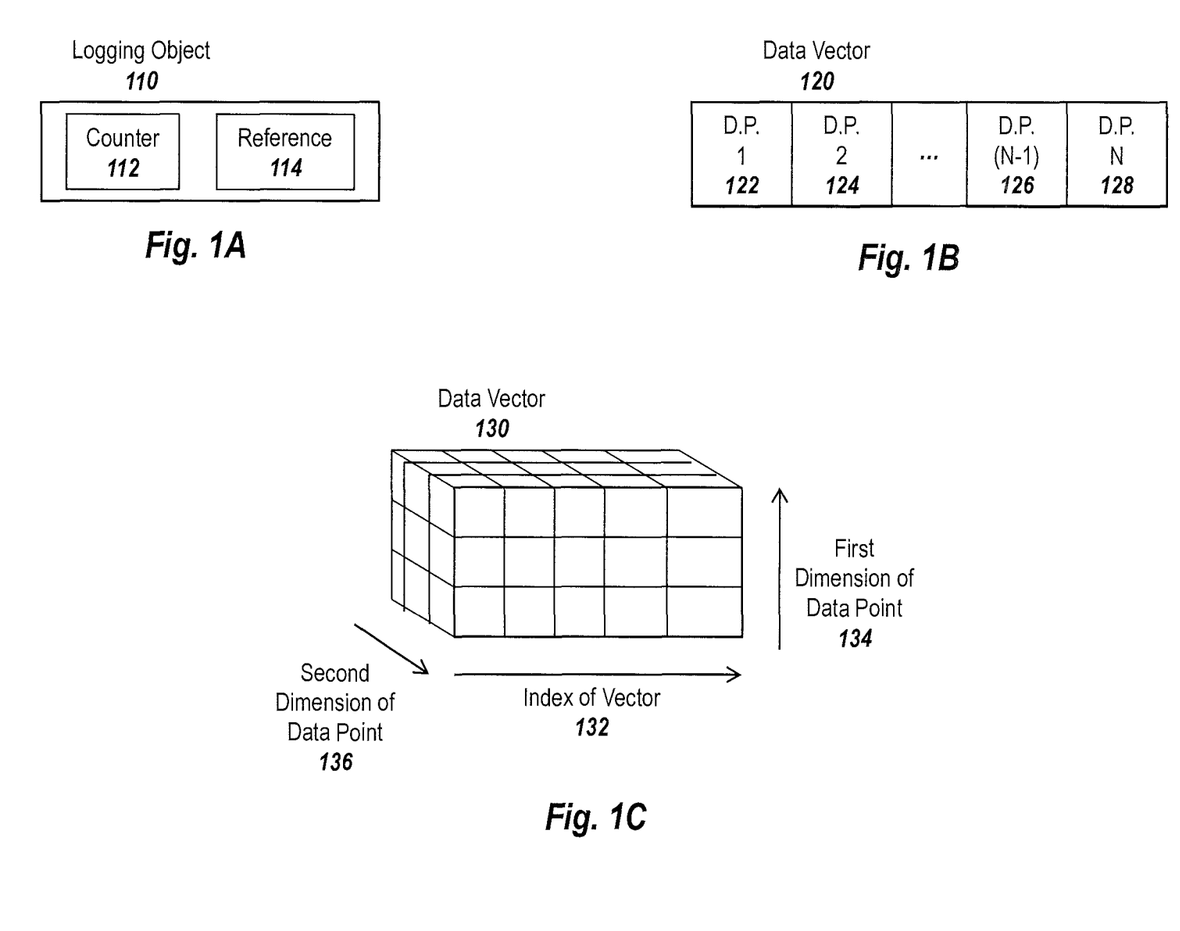
FIG. 1A is an example of a logging object.
FIG. 1B is an example of a data vector that may be indexed using a single index value.
FIG. 1C is an example of a data vector including multidimensional data points.

An example of a logging object 110 is depicted in FIG. 1A. The logging object 110 may include a counter 112 and a reference 114.

The counter 112 may have a value that identifies how many data points the logging object 110 has been requested to log. In an embodiment, counter 112 may be initialized to zero if the logging object 110 is created before any requests for data logging have been received. Alternatively, the logging object 110 may be created when an initial request to log data is received, in which case the counter may be initialized to 1.

The reference 114 may have a value that identifies a storage location where a data vector associated with the logging object 110 may be found. The reference 114 may be, for example, a pointer to a location in memory where an associated data vector is located. Alternatively, the reference 114 may identify the data vector by name or using some other identifier. A central repository, such as a table or other type of data store, may map identifiers to vectors. The logging object may query the repository to locate the data vector corresponding to the identifier stored in the logging object's reference 114.

An example of a data vector 120 is shown in FIG. 1B. The data vector 120 may store data points 122, 124, 126, 128 using a suitable data structure. The data vector 120 may be associated with a size that describes how many data points are present in the vector. The data vector 120 may be represented as a logically or physically contiguous portion of memory in an electronic device, where the contiguous memory portion is associated with a starting address and an amount of memory associated with the vector as represented by the vector's size.

Each data point 122, 124, 126, 128 may be associated with an index value that describes the data point's location in the vector. The index value of the vector may represent an offset from the vector's starting address where the data point may be found in the electronic device's memory. For example, if there are N data points with data point 122 being a first data point and the data point 128 being a last data point. In the example, data point 122 may be at vector index "0," the data point 124 may be at vector index "1." Further, data point 126 may be at vector index "N-2," and data point 128 may be at vector index "N-1." Although data vectors are typically indexed beginning with the $0^{th}$ index location (and thus the $N^{th}$ data point in the vector is stored at vector index N-1), a size of the vector typically reflects the total number of elements stored in the vector (and thus the size of the data vector 120 of FIG. 1B is N, not N-1). It should be noted that the present invention may use substantially any starting index and indexing technique.

For example, the $i^{th}$ data point, having a value V, in a data vector named "firstvector" (which would be stored in the $(i-1)^{st}$ index location) may be represented as:

$$firstvector[i-1]=V$$

Although the data vector 120 depicted in FIG. 1B stores data having a single dimension (e.g., an array), a data vector need not be limited to a single dimension. For example, FIG. 1C depicts an example of a data vector 130 representing multidimensional data. The data vector 130 has an index 132, which represents the dimension along which the data log is progressing. The data vector 130 further represents a first dimension of a data point 134 and a second dimension of a data point 136. Thus, for any given index 132, a first dimension and a second dimension of a data point may be obtained.

For example, a data point (having a value V) stored at the first index location "x," second index location "y," and third index location "z" of a data vector named "secondvector" may be represented as:

$$secondvector[x-1,y-1,z-1]=V$$

Figure 1D:
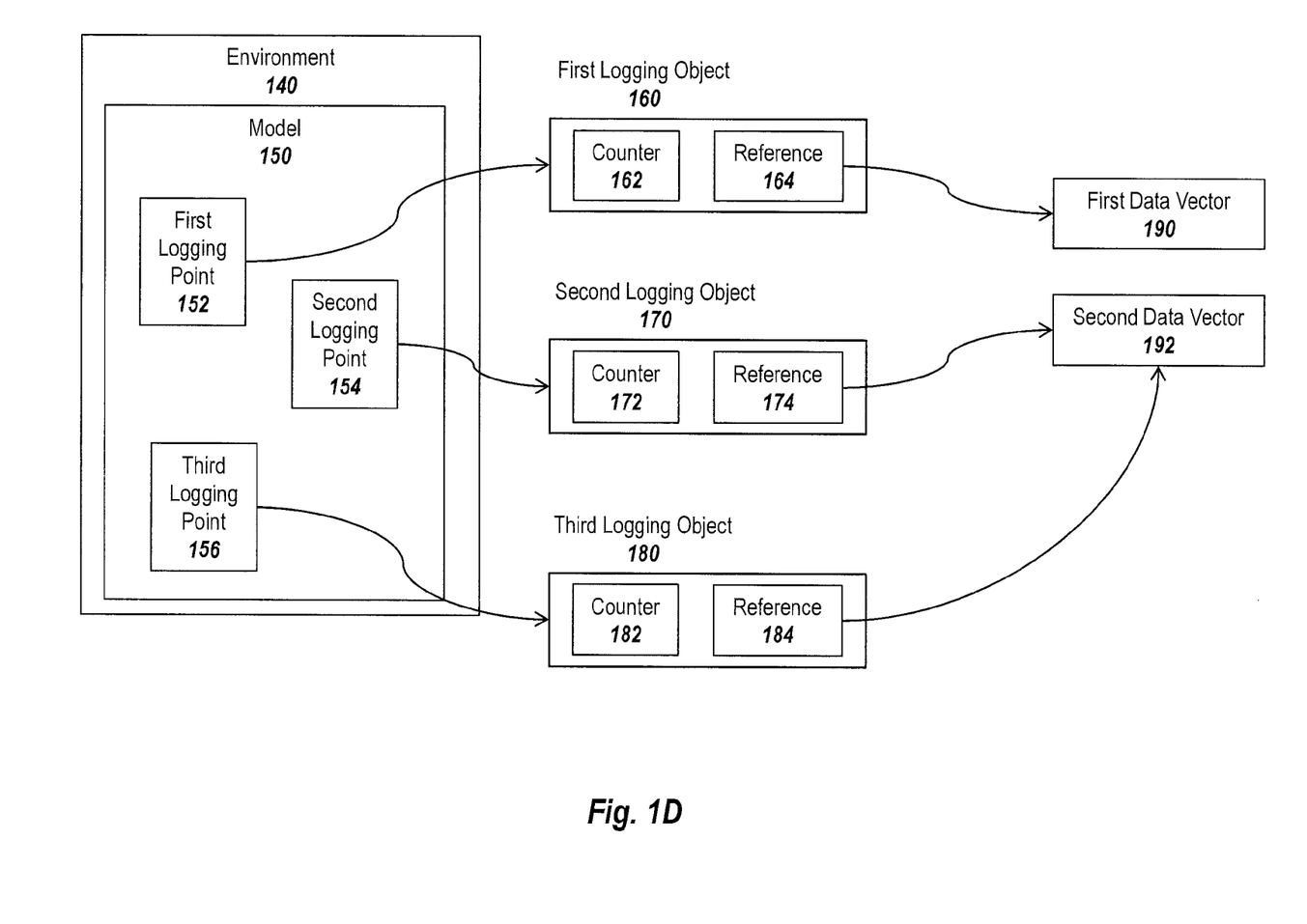
FIG. 1D is an example of logging objects and data vectors used together to log data from multiple logging points in a model.

The logging objects 110 and data vectors 120 may be used to log data from data logging points, as shown in FIG. 1D. As shown in FIG. 1D, an environment 140 may support an arbitrary model 150. An arbitrary model may be a model that is independent of the logging infrastructure. Thus, substantially any type of model may utilize the logging infrastructure described herein by making calls to the functionality exposed by the logging infrastructure and made available to the model 150.

The environment 140 may be any type of environment that is capable of interacting with model 150. Examples of environments 140 include, but are not limited to, Simulink, Stateflow, and MATLAB, each of the MathWorks, Inc. of Natick, Mass. Further examples of environments and models will be provided below with respect to FIG. 6.

The model 150 may be any type of model that represents a system, such as a dynamic system. Models may have executable semantics and may be executable. Models may include, but are not limited to, block diagrams, state diagrams, data flow diagrams, etc. The model 150 may be provided in the environment 140.

Within the model 150, logging points may process data or cause data to be processed. For example, a first logging point 152 a second logging point 154, and a third logging point 156 may be provided. The logging points 152, 154, 156 may be hardware or software constructs, or a combination of hardware and software. The logging points 152, 154, 156 may represent, for example, blocks in a block diagram model, ports of blocks in a block diagram model, signal lines between blocks in a block diagram model, states in a state transition diagram model, transitions in a state transition diagram model, memory locations of variables in a model, signal logging antennas, scopes, etc. The logging points interact with logging objects to log the data.

A first logging object 160 including a counter 162 and a reference 164 is associated with the first logging point 152. A second logging object 170 including a counter 172 and a reference 174 is associated with the second logging point 154. A third logging object 180 including a counter 182 and a reference 184 is associated with the third logging point 156.

The logging points 152, 154, 156 and the logging objects 160, 170, 180 need not be present in the same model 150, but may be spread between two or more distinct models. In this way, different models may share data logs. For example, a first logging point may be present in a first model, and the first logging point may generate data that corresponds to a second logging point from a second model. Using the techniques described herein, the first logging point may share a data log with the second logging point.

Each of the logging objects 160, 170, 180 is associated, through its respective reference 164, 174, 184, with one of the data vectors 190, 192. By causing multiple references to point to the same data vector, a single data vector may be shared between multiple logging objects. For example, in FIG. 1D the first logging object 160 is associated with a first data vector 190 because reference 164 of first logging object 160 points to the first data vector 190. Second logging object 170 is associated with a second data vector 192 because reference 174 of second logging object 170 points to second data vector 192. Third logging object 180 is also associated with second data vector 192 because reference 184 of third logging object 180 also points to second data vector 192. Thus, the second logging object 170 and the third logging object 180 share second data vector 192.

It should be noted that two or more objects sharing a data vector have not necessarily logged the same number of data points. For example, consider a data vector having ten values [0, 1, 2, 3, 4, 5, 6, 7, 8, 9]. A first logging object may have logged all ten of those values so that the log of the first logging object is represented by the ordered set [0, 1, 2, 3, 4, 5, 6, 7, 8, 9]. However, a second logging object may have logged only three values: [0, 1, 2]. In this case, the first logging object and the second logging object can share the data vector because at least the subset of the data vector that is relevant to the second logging object is present at the beginning of the data vector used by the first logging object (i.e., [0, 1, 2]).

In the example, the counter of the first logging object would read "10," because the first logging object has logged 10 values. The counter of the second logging object would read "3," because the second logging object has logged only 3 values. Therefore, the correct data log for the second logging object can be found by reading 3 (the value of the counter) entries from the shared vector. If the second data object attempted to log the value "100" as the second data object's $4^{th}$ data point, the second data object may no longer share the data vector with the first logging object because the $4^{th}$ value in the shared data vector is 3, not 100. Accordingly, the second logging object may be divorced from the shared vector and may either share a different vector having the appropriate log values, 0, 1, 2, 100, or may create a new vector if it is not possible to share a vector. In another embodiment, the second logging object may create an additional pair of counter and reference. The additional pair may refer to a shared vector that contains the unshared log value 100 while the original pair of counter and reference refers to the log values 0, 1, 2, which is maintained as a shared log.

As a concrete example, consider three sensors (S1, S2, S3) that may record data, such as a data stream. In this example, each sensor is a logging point 152, 154, 156. A request to log the data of each sensor may be made on behalf of the sensor as the data is received. For example, sensor S1 may request that a logging system log the data point "5," followed by the data point "2," followed by the data point "1." The sensor S2 may request that the logging system log the data point "5," followed by the data point "7," followed by the data point "1." The sensor S3 may request that a logging system log the data point "5," followed by the data point "7," followed by the data point "1." In this case, sensors S2 and S3 may share data logs because both S2 and S3 have logged the same data. Sensor S1 has logged at least one different data point, and therefore may not share the entire data log of sensors S2 and S3 (although some partial sharing may be possible).

Figure 2:
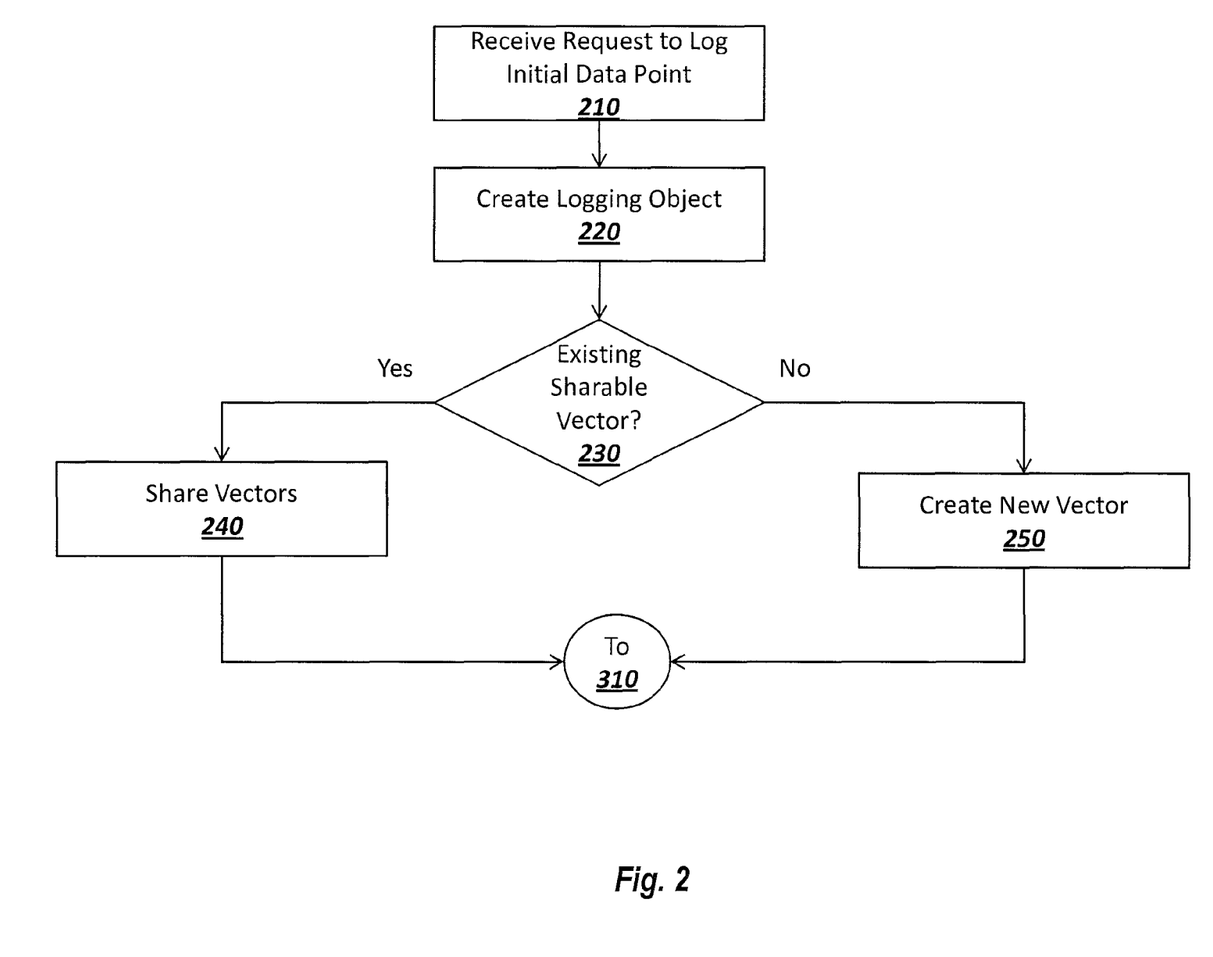
FIG. 2 is a flowchart depicting an initial setup for a logging object that logs an initial data point.
Figure 3:
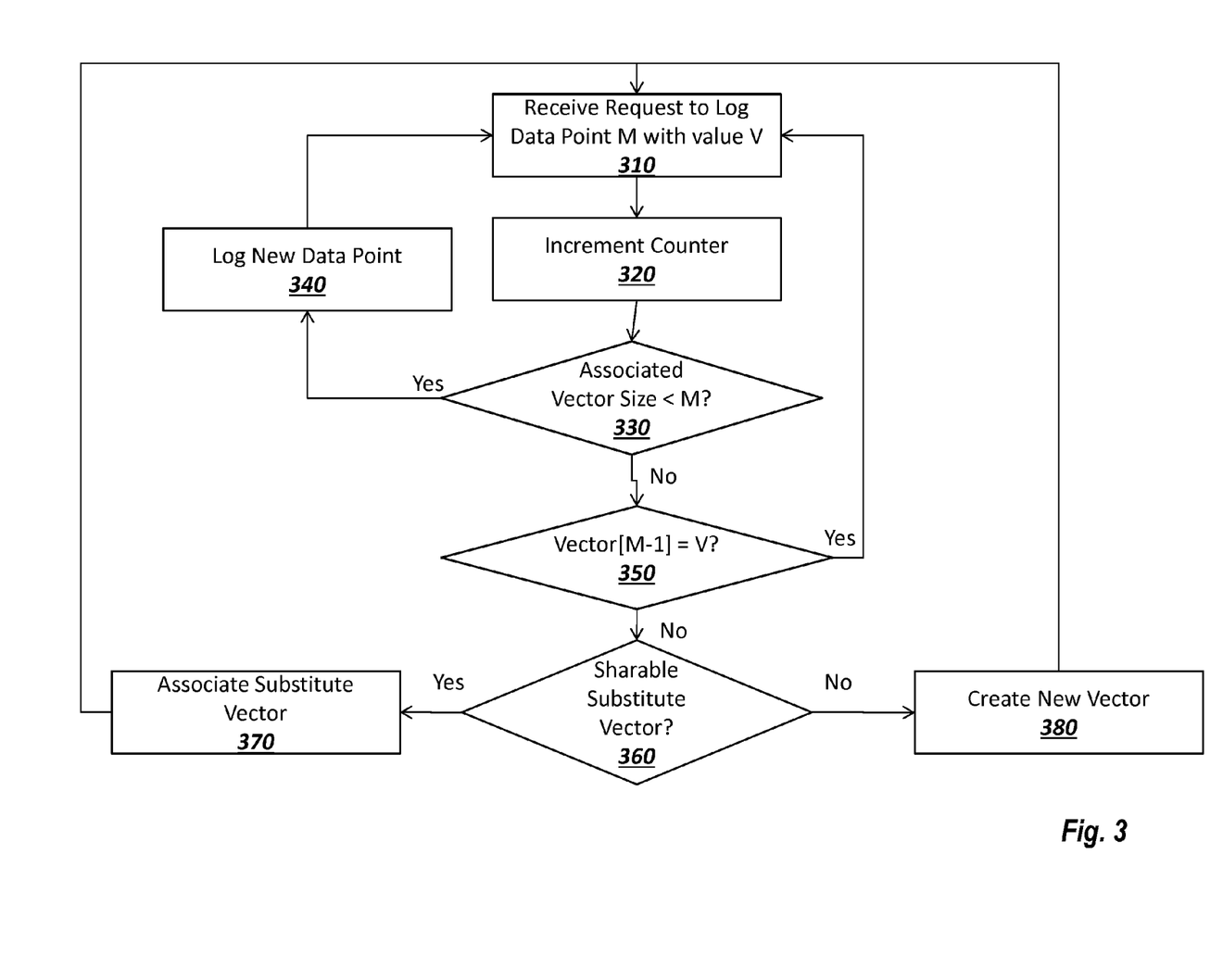
FIG. 3 is a flowchart depicting subsequent requests to log further data points after the procedure described in FIG. 2.

An example of a technique for sharing data logs amongst logging points in a model is described with reference to FIG. 2 and FIG. 3. FIG. 2 is a flowchart depicting an initial setup for a logging object that logs an initial data point. FIG. 3 is a flowchart depicting subsequent requests to log further data points.

Referring to FIG. 2, a request to log an initial data point may be received (step 210). The request may originate, for example, from the environment 140, the model 150, or a logging point itself.

The request may be received at a logging object associated with the logging point that generated the data point that is the subject of the request. Alternatively, the request may be received at a data logging environment that is responsible for logging the data. The data logging environment may be the same as the environment 140 containing the model 150, or may be a different environment.

The request may provide a value to be logged to the logging object or environment. In one example, the logging object may be provided as a part of an application program interface (API) that exposes methods to the environment 140. One of the methods may provide a way to request that the logging object for which the method is called log a data point. For example, such a method may be represented as:

log(d)

where "log" is the name of the method and "d" represents the value to be logged. If a logging object named "datalog1" is created, then a logging point can request that the object "datalog1" log a data point "d" by calling the method:

datalog1.log(d)

At step 220, a logging object may be created in response to the request to log the initial data point. In one example, an exemplary logging infrastructure provides logging object classes, data vector classes, and an API exposed to entities internal and external to the logging infrastructure (such as the environment 140). A class constructor of the API may be called to create a logging object. The logging object may be created with an initial counter 112 value of "1" to indicate that the logging object is associated with a first initial value. The logging objects may be created with a NULL reference 114.

Step 220 may be carried out before step 210; that is, one or more logging points may be identified in the model before the logging points begin to process data, and logging objects may be created for the logging points. In this case, the logging objects may be created with a counter value of "0." Alternatively, the logging point may begin to process data, and once the logging point requests that an initial data point be logged, an associated logging object may be created to accept the data point. In another embodiment, the logging point may store a number of data points before requesting that the initial data point and/or subsequent data points be logged by a logging object.

At step 230, it is determined if the newly-created logging object can share an existing data vector. In order to determine whether an existing data vector can be shared, the first value of any existing data vector may be compared to the initial value that was requested to be logged at step 210. If any existing data vector has a matching initial value, then the answer at step 230 is "yes" and processing proceeds to step 240. If more than one existing data vector has a matching initial value, then the logging object may use the first vector that is located having the matching initial value. Alternatively, a vector may be chosen at random from among the vectors having the matching initial value.

In another example, a vector may be chosen based on criteria. For example, the logging object may become associated with a vector that is associated with the most or least other logging objects (e.g., the most or least "popular" vector), or with a vector that is associated with a logging point having common characteristics with the logging point that requested that the data point be logged in step 210. However, these options may require that certain additional information about the vectors or logging points be known to the logging objects. The additional information may undermine the ability of a logged object to interact with an arbitrary model 150. Accordingly, it may be preferable to simply choose the first available matching vector.

In yet another example, user input may be requested to choose the vector that the logging object is to be associated with.

At step 240, the logging object created at step 220 associates itself with the matching vector identified at step 230. This may be achieved, for example, by causing the reference of the logging object to point to the matching vector. Processing then proceeds to step 310 of FIG. 3.

If no existing data vector has a matching initial value at step 230, then the answer at step 230 is "no" and processing proceeds to step 250. Similarly, if no data vectors yet exist, then the answer at step 230 is "no" and processing proceeds to step 250.

At step 250, a new data vector is created for the logging object created at step 220. A new data vector may be created by calling a class constructor associated with a data vector class. A data vector having a different size may also be created, and the data vector may be resized as needed. The initial data point identified at step 210 may then be stored in the newly created data vector at the first index value (e.g., index value "0"). Alternatively, if the data vector class includes a constructor that allows the vector to be created with initial data, then a suitable constructor may be called to create a new vector populated with the initial data point identified at step 210.

Once the new vector is created and associated with the logging object created at step 220, processing proceeds to step 310 of FIG. 3.

At step 310, the logging object is already associated with a logging point and a data vector that may be shared with other logging objects. Accordingly, at step 310 the logging object may receive a request to log a subsequent data point (e.g., any data point after the initial data point) from the logging object's associated logging point. The data point may be the $M^{th}$ data point logged by the logging object. The request may indicate a value V to be logged. For example, the logging point, the environment 140, or the model 150 may instruct the data object "datalog1" to log the value V by calling the method:

datalog1.log(V)

Before the request is received, the counter of the logging object is set to N-1 (because, previously, N-1 data points have been logged by the object). In order to account for the new request, the counter of the data object is incremented at step 320 so that the counter reflects that N data points have been logged (or requested to be logged).

At step 330 the logging object queries the data vector currently associated with the logging object for the associated data vector's size. For example, the data vector may be represented by an object having a method such as "sizeof( )" that returns the size of the data vector.

Alternatively, the data vector may be represented by an object having a property such as "length" that allows the size of the vector to be determined by determining the value of the property, as in the example below:

int size=datavector1.length

The logging object may compare the size of the associated data vector with the current value of the logging object's counter (N).

A size of the associated data vector that is less than N may indicate that the data vector has logged fewer data points than the logging object. Because the logging object has been successfully associated with the data vector to this point, it can be assumed that there are N-1 data points in the associated data vector, which correspond to the first N-1 points logged by the logging object. Further, the first N-1 points of the associated data vector are the same as the (at most) N-1 data points logged by any other logging objects currently sharing the data vector. The other logging objects currently sharing the data vector have not yet logged an $N^{th}$ data point, because otherwise the size of the data vector would be at least N. Therefore, the logging object may safely append the value V to the end of the vector at step 340. Processing may return to step 310 while the logging object awaits another data log request from the associated logging point.

On the other hand, if at step 330 the size of the data vector associated with the logging object is N or greater, then the data vector is shared with other logging objects and there are values in the data vector that have the potential to conflict with the value V that the current data object is attempting to log. Accordingly, at step 350, the logging object queries for the $N^{th}$ value stored in the data vector currently associated with the logging object. For example, the data vector may be represented by an object having a method such as "getvalue (i)" that returns the $i^{th}$ value of the data vector, as in the example below:

datavector1.getvalue(i)

Alternatively, the data vector may be represented by an object that can be queried for a value by specifying which value is requested, as in the example below:

value=datavector1[i]

The $N^{th}$ value stored in the data vector may be compared to the value V in order to determine whether the two values are equal. The $N^{th}$ value may be compared to the value V in a number of ways. For example, the $N^{th}$ value and the value V may be compared using a simple comparison operator (such as "=" or "<" or ">") in order to determine whether the values are equal. If the $N^{th}$ value and the value V represent objects instead of scalar values (or represent compound values), the objects or compound values may be compared using a built-in comparison operator of the object class. Alternatively, a user may specify how the objects or compound values are to be compared. If an unknown object class is encountered, or if the environment is not programmed with predetermined instructions for comparing values of the types represented by the $N^{th}$ value and the value V, a prompt may be presented asking whether the values are equal and/or how equality for the value types should be determined in the future.

Values represented by different types may also be compared. For example, the $N^{th}$ value may be an integer while the value V may be a double. The environment may compare these values using the built-in comparison operators of the value types. Alternatively, the environment may include a default rule which states that values of different types can never be equal, even if they have the same underlying value (e.g., integer 8 and double 8.0). The rules for comparing values of different types may be specified by a user.

If an object is stored in the vector and the object includes two or more data fields, the object may be determined to be equal to a value if one or more of the data fields are equal. Alternatively, it may be determined that an object having multiple fields is equal to a multi-fielded value only if the object and value share all of the same fields.

In the case of logging points logging objects having multiple data fields, the logging points may share a single vector representing all the data fields, or each data field may be assigned an individual vector such that a single logging point refers to multiple vectors. Thus, the objects may be decomposed into primitive data sequences that are stored in the data vectors.

If it is determined at step 350 that the $N^{th}$ value stored in the data vector (at index N-1) is equal to the value V, then no action needs to be taken, because the value that the logging point requested to be logged is already present in the shared vector. Therefore, processing may return to step 310 while the logging object awaits another data log request from the associated logging point.

If it is determined that the $N^{th}$ value in the data vector is not equal to the value V that the logging point requested to be logged, then it is determined that the logging object cannot continue to share the data vector currently associated with the logging object. Accordingly, at step 360 it is determined if a suitable substitute vector exists that the logging object can share.

The existence of a suitable substitute vector may be determined in a number of ways. For example, it is known that the first N-1 values of the previously associated data vector correspond to the data log of the logging object, and that the $N^{th}$ value of the data log is the value V. Accordingly, each existing data vector may be queried until a data vector is found having the same first N logged values.

Alternatively, in some circumstances it may be likely that the initial values in the vector are the same, but the values begin to diverge after a certain point. In these circumstances it is more likely that any differences that exist in the data vectors will be found at the end of the vectors. Accordingly, in order to conserve processing resources by searching the vectors more efficiently, the data vectors may be searched backwards for correspondence with the data log of the logging object. That is, a search for correspondence may begin with the $N^{th}$ value of the data vectors and check backwards for correspondence to the $1^{st}$ value of the data vectors.

Yet alternatively, a checksum (e.g., using the MD5 algorithm) for the data stored in each of the vectors may be compared. Comparison of the checksum of the data to be logged with the checksums of the vectors may then provide candidates for a substitute data vector.

If it is determined at step 360 that a substitute data vector exists, then at step 370 the substitute data vector is associated with the logging object. This may be achieved by updating the reference 114 of the logging object to refer to the substitute data vector. For example, if the reference 114 is a pointer, then the pointer may be changed to point to the substitute data vector. Processing then returns to step 310 as the logging object awaits another data log request from the associated logging point.

If it is determined at step 360 that a suitable substitute data vector does not exist, then at step 380 a new data vector may be created for the logging object. The new vector may be populated with the first N-1 values from the previously associated data vector and the new value V to be logged in the new vector. Processing then returns to step 310 as the logging object awaits another data log request from the associated logging point.

At any point, the results of logging the data may be displayed on a display device using a graphical viewer (e.g., a GUI). For example, a user may be shown which logging vectors contain data from the various data logs, such as in a relational graph.

For some data points, the environment may be aware of certain data points that will be logged even before the model is executed. For example, certain data values may be determined at compile time (e.g., in the case of time data, some data may be known based on predetermined sample times that will be used during the execution of the model). In this case, data logs for the logging points associated with this already-known data may be populated with known information before execution of the model begins. Sharable vectors may also be shared between the logging points before execution of the model begins.

Similarly, predetermined information may also be used to exclude the possibility of data sharing. For example, if a compiler determines that two variables are of different data types (in a situation where variables of different data types are treated as inherently unequal), the compiler may report this information to the logging infrastructure so that the logging infrastructure never attempts to share data logs in situations involving the different variables.

The technique described above allows data logs to be created independent of the type of environment 140, model 150, logging points, or data to be logged. By sharing data vectors among logging objects, increased levels of processor and/or memory efficiency may be realized. Compressing data vectors and/or making the data vectors into circular buffers may further improve the processor and/or memory efficiency of the techniques. Such a procedure is described by the state diagram of FIG. 4.

Figure 4:
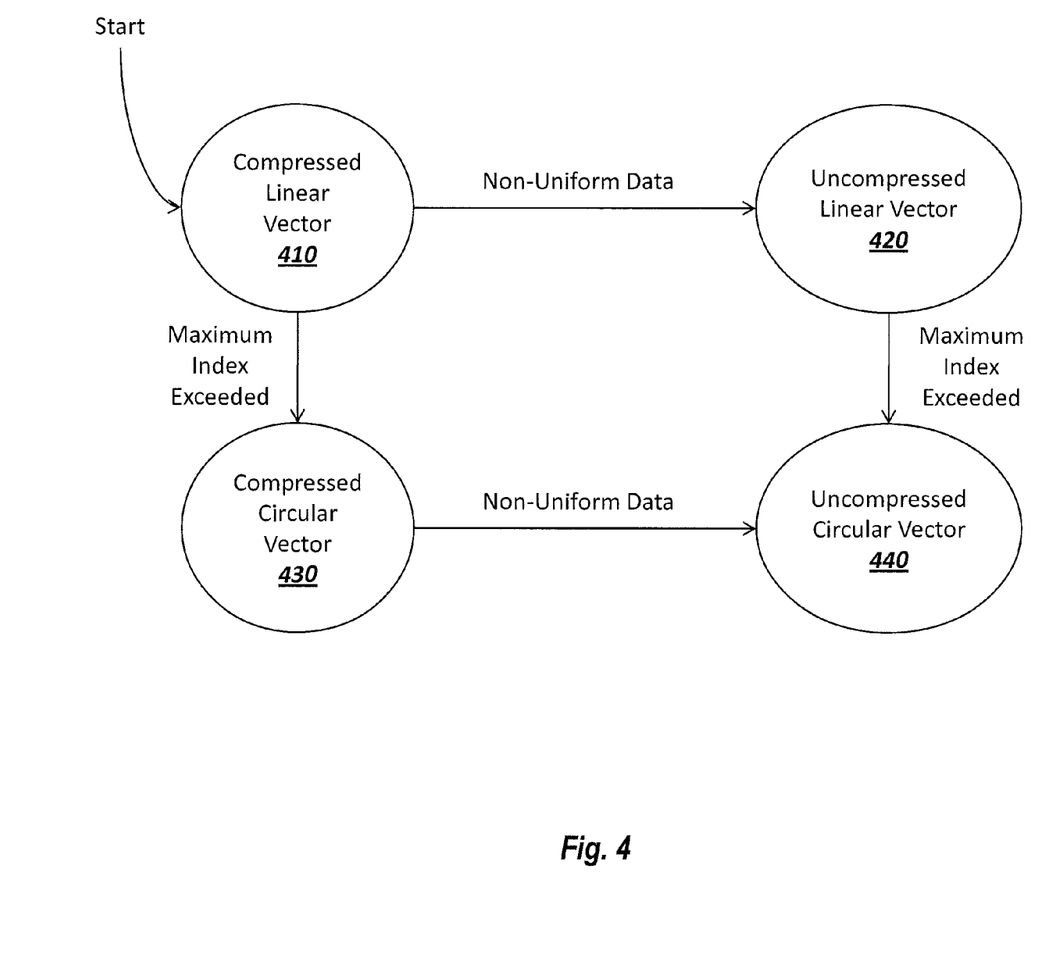
FIG. 4 is a state diagram depicting a technique for efficiently storing data logs.

As shown in FIG. 4, when a new data vector is created, the data vector may be stored as a compressed linear vector at state 410. At state 410, it may be known that the data in the vector is uniform (e.g., spaced at regular intervals). This is because the vector is typically created either empty (with 0 data points) or with a single data point, and three or more data points may be required before data can be non-uniform (e.g., not spaced at regular intervals).

A vector storing uniform data may be stored in a compressed format by identifying the starting value of the data, the pattern present in the data, and the number of values or ending value of the data. For example, if a data vector stores the following data log:

[50, 52, 54, 56, 58, 60, 62]

Then the data vector can be represented in the following compressed manner:

{50, +2, 7}

As long as the data remains uniform, the data vector can remain compressed. However, when non-uniform data is detected, the data vector may become uncompressed as represented at state 420. To uncompress or decompress the data vector, the values of the data log may be derived from the compressed form of the data vector, with the new non-uniform data point appended to the end.

In the above example, if the next value to be logged is "63," then the data vector may be uncompressed by starting with value 50 and storing a total of 7 values, each next value being 2 greater than the value that preceded it. The $8^{th}$ value may be 63.

Exemplary embodiments can make use of data compression techniques known in the art. An appropriate technique may be selected based on the type of data and/or the data points to be logged.

In order to save storage space, a data vector may also be associated with a maximum index threshold. The maximum index threshold may be predetermined, or may be specified by a user before, during, or after the creation of a data vector. When a request comes to log a new data point, the data vector may check the new size of the data vector against the maximum index threshold. If the maximum index threshold is exceeded, then the data vector may be converted from a linear vector to a circular vector. The circular vector may use a circular buffer, overwriting earlier values with new additions in a first-in-first-out (FIFO) manner. As shown by states 430 and 440, a compressed or an uncompressed vector may be stored in a circular format.

It is also possible to create a vector already populated with a number of data points, as when a substitute vector is created when a data point is divorced from an existing associated data vector. In this case, it may be determined, at the time of vector creation, whether the data in the vector is uniform and whether the number of data points requested to be logged exceeds the maximum threshold. The vector may then be created as compressed or uncompressed and linear or circular as the situation warrants.

Figure 5:
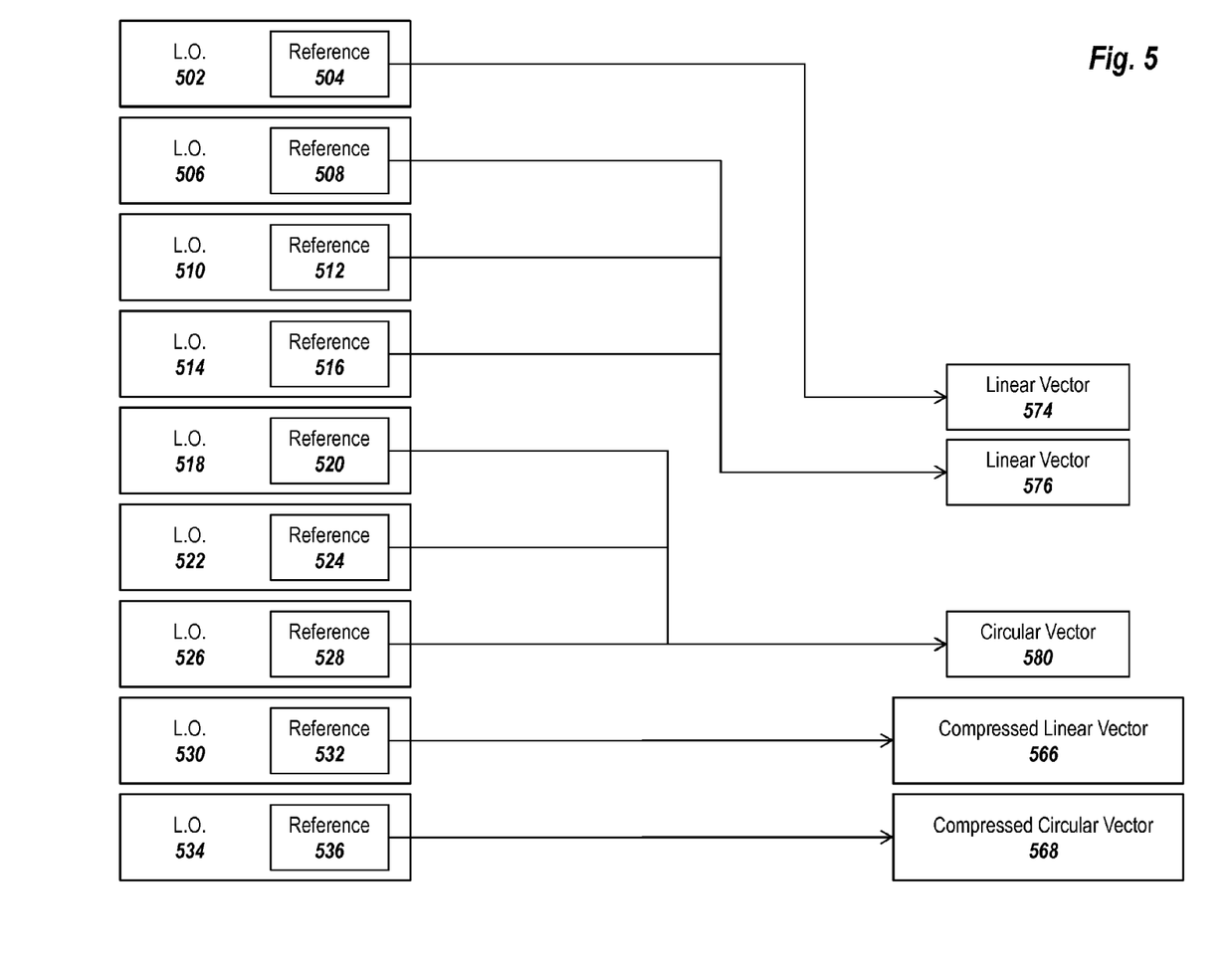
FIG. 5 is an example of compressed, uncompressed, linear, and circular data logs, some of which are shared between multiple logging objects.

An example of compressed and uncompressed, linear and circular, and shared and unshared vectors is provided in FIG. 5. As shown in FIG. 5, 9 logging objects 502, 506, 510, 514, 518, 522, 526, 530, 534 are associated with logging points in a model (not shown). Each logging object has an associated reference 504, 508, 512, 516, 520, 524, 528, 532, 536 that points to a respective logging vector 566, 568, 574, 576, or 580.

In the example of FIG. 5, the logging object 502 is associated with the data log represented by the linear vector 574. The logging objects 506, 510, 514 are associated with the data log represented by the linear vector 576 that is shared between the logging objects 506, 510, 514. Similarly, the logging objects 518, 522, 526 are associated with the data log represented by the circular vector 580 that is shared between the logging objects 518, 522, 526.

The vectors 574, 576, 580 may be uncompressed vectors. As shown by the compressed linear vector 566 and the compressed circular vector 568, it may not be necessary to share compressed vectors (or to make the compressed vectors sharable to begin with), and thus a logging object may be associated with an unshared compressed vector. It may not be necessary to share compressed vectors because in some circumstances the representation of the compressed vector is smaller than the structures needed to share the compressed vector. For example, if a compressed vector can be represented in a smaller amount of memory space than a pointer for pointing into the vector collection 570, it would be more beneficial to simply store each compressed vector individually without attempting to share the compressed vector.

Figure 6:
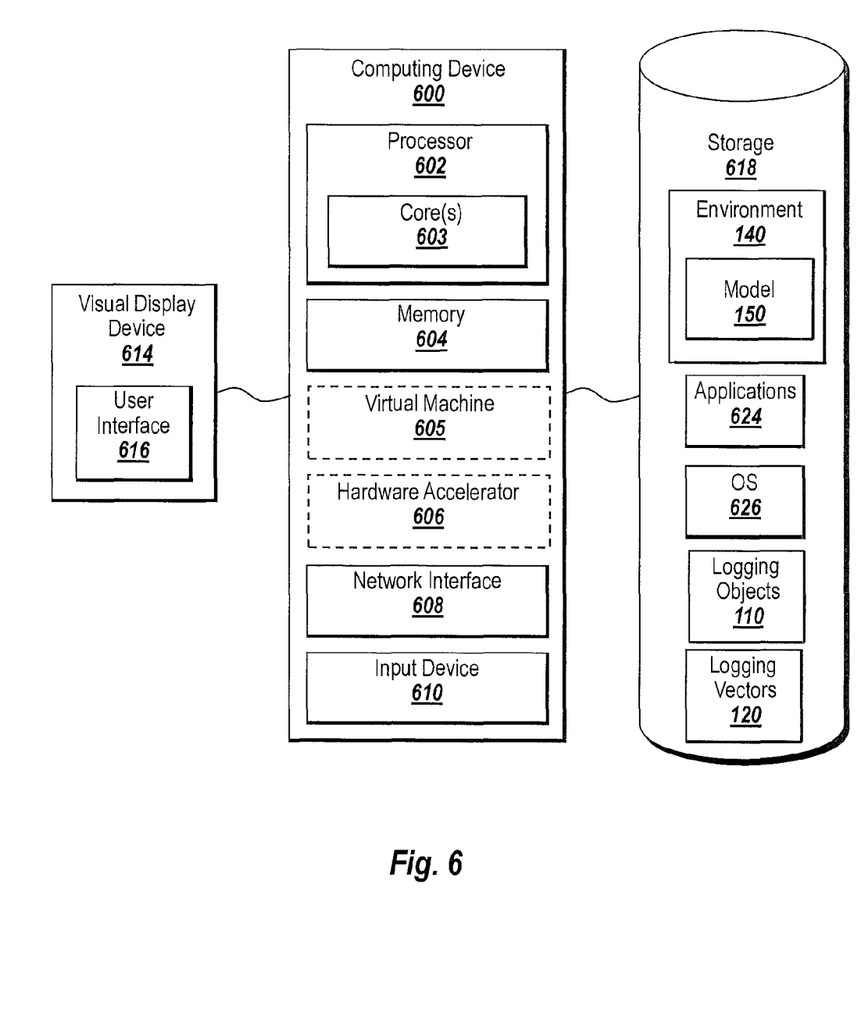
FIG. 6 is an exemplary electronic device suitable for performing the methods described herein.

One or more of the above-described acts may be encoded as computer-executable instructions executable by processing logic. The computer-executable instructions may be stored on one or more non-transitory computer readable media. One or more of the above described acts may be performed in a suitably-programmed electronic device. FIG. 6 depicts an electronic computing device 600 that may be suitable for use with one or more acts disclosed herein.

The computing device 600 may take many forms, including but not limited to a computer, workstation, server, network computer, quantum computer, optical computer, Internet appliance, mobile device, a pager, a tablet computer, a smart sensor, application specific processing device, etc.

The computing device 600 is illustrative and may take other forms. For example, an alternative implementation of the computing device 600 may have fewer components, more components, or components that are in a configuration that differs from the configuration of FIG. 6. The components of FIG. 6 and/or other figures described herein may be implemented using hardware based logic, software based logic and/or logic that is a combination of hardware and software based logic (e.g., hybrid logic); therefore, components illustrated in FIG. 6 and/or other figures are not limited to a specific type of logic.

The processor 602 may include hardware or software based logic to execute instructions on behalf of the computing device 600. In one implementation, the processor 602 may include one or more processors, such as a microprocessor. In one implementation, the processor 602 may include hardware, such as a digital signal processor (DSP), a field programmable gate array (FPGA), a Graphics Processing Unit (GPU), an application specific integrated circuit (ASIC), a general-purpose processor (GPP), etc., on which at least a part of applications can be executed. In another implementation, the processor 602 may include single or multiple cores 603 for executing software stored in a memory 604, or other programs for controlling the computing device 600.

The computing device 600 may include one or more tangible non-transitory computer-readable storage media for storing one or more computer-executable instructions or software that may implement one or more embodiments of the invention. The non-transitory computer-readable storage media may be, for example, the memory 604 or the storage 618. The memory 604 may include a computer system memory or random access memory (RAM), such as dynamic RAM (DRAM), static RAM (SRAM), extended data out RAM (EDO RAM), Content Addressable Memory (CAM), etc. The memory 604 may include other types of memory as well, or combinations thereof.

One or more processors 602 may include a virtual machine (VM) 605 for executing the instructions loaded in the memory 604. A virtual machine 605 may be provided to handle a process running on multiple processors so that the process may appear to be using only one computing resource rather than multiple computing resources. Virtualization may be employed in the computing device 600 so that infrastructure and resources in the computing device may be shared dynamically. Multiple VMs 605 may be resident on a single processor 602.

A hardware accelerator 606, may be implemented in an ASIC, FPGA, or some other device. The hardware accelerator 606 may be used to speed up the general processing rate of the computing device 600.

The computing device 600 may include a network interface 608 to interface to a Local Area Network (LAN), Wide Area Network (WAN) or the Internet through a variety of connections including, but not limited to, standard telephone lines, LAN or WAN links (e.g., T1, T3, 56 kb, X.25), broadband connections (e.g., integrated services digital network (ISDN), Frame Relay, asynchronous transfer mode (ATM), wireless connections (e.g., 802.11), high-speed interconnects (e.g., InfiniBand, gigabit Ethernet, Myrinet) or some combination of any or all of the above. The network interface 708 may include a built-in network adapter, network interface card, personal computer memory card international association (PCMCIA) network card, card bus network adapter, wireless network adapter, universal serial bus (USB) network adapter, modem or any other device suitable for interfacing the computing device 600 to any type of network capable of communication and performing the operations described herein.

The computing device 600 may include one or more input devices 610, such as a keyboard, a multi-point touch interface, a pointing device (e.g., a mouse), a gyroscope, an accelerometer, a haptic device, a tactile device, a neural device, a microphone, or a camera, that may be used to receive input from, for example, a user. Note that computing device 600 may include other suitable I/O peripherals.

The input devices 610 may allow a user to provide input that is registered on a visual display device 614. A graphical user interface (GUI) 616 may be shown on the display device 614.

A storage device 618 may also be associated with the computer 600. The storage device 618 may be, for example, a hard-drive, CD-ROM or DVD, Zip Drive, tape drive, flash drive, or other suitable tangible computer readable storage medium capable of storing information. The storage device 618 may be useful for storing application software programs, such as an environment 140 (which may be, for example the MATLAB® environment or the Simulink® environment) including a model 150 (such as a block diagram model), applications 624 and an operating system (OS) 626. The storage 618 may further store one or more logging objects 110 and one or more logging vectors 120.

The environment 140 may include a text-based modeling environment, a graphical modeling environment, or some other modeling environment. Examples of environments may include MATLAB® and Simulink®, Stateflow®, Simscape™, and SimMechanics™ which are available from The MathWorks, Inc.; LabVIEW® or MATRIXx available from National Instruments, Inc; Mathematica® available from Wolfram Research, Inc.; Mathcad available from Mathsoft Engineering & Education Inc.; Maple™ available from Maplesoft, a division of Waterloo Maple Inc.; Poseidon for UML by Gentleware, AG of Hamburg, Germany; MagicDraw by NoMagic, Inc., of Plano, Tex.; Comsol available from Comsol AB of Sweden; Scilab™ available from The French National Institution for Research in Computer Science and Control (INRIA), Le Chesnay Cedex, France; and GNU Octave, available from the GNU Project; SoftWIRE available from Measurement Computing; VisSim available from Visual Solutions; WiT available from DALSA Coreco; VEE Pro available from Agilent; Dymola available from Dynasim AB; Extend available from Imagine That, Inc.; Scicos available from The French National Institution for Research in Computer Science and Control (INRIA); MSC.Adams® available from MSC.Software Corporation; Rhapsody® and Rational® available from International Business Machines Corporation; ARTiSAN Studio available from ARTiSAN Software Tools, Inc.; and SCADE™ from Esterel Technologies, Inc.

Environments 140 may be programs that may enable, for example, a user to construct and analyze a model 150 of a process or system. Examples of models 150 may include, for example, time-based block diagram models, discrete event diagram models and state machine diagram models, dataflow diagram models, and other models, such as Unified Modeling Language (UML) models, among others.

The computing device 600 can be running an operating system (OS) 626. Examples of OS 626 may include the Microsoft® Windows® operating systems, the Unix and Linux operating systems, the MacOS® for Macintosh computers, an embedded operating system, such as the Symbian OS, a real-time operating system, an open source operating system, a proprietary operating system, operating systems for mobile computing devices, or other operating system capable of running on the computing device and performing the operations described herein. The operating system may be running in native mode or emulated mode.

One or more embodiments of the invention may be implemented using computer-executable instructions and/or data that may be embodied on one or more non-transitory tangible computer-readable mediums. The mediums may be, but are not limited to, a hard disk, a compact disc, a digital versatile disc, a flash memory card, a Programmable Read Only Memory (PROM), a Random Access Memory (RAM), a Read Only Memory (ROM), Magnetoresistive Random Access Memory (MRAM), a magnetic tape, or other computer-readable media.

One or more embodiments of the invention may be implemented in a programming language. Some examples of languages that may be used include, but are not limited to, Python, C, C++, Objective C, C#, SystemC, Java, Javascript, a hardware description language (HDL), unified modeling language (UML) and derived profiles and languages (e.g., SysML), and Programmable Logic Controller (PLC) languages. Further, one or more embodiments of the invention may be implemented in a hardware description language or other language that may allow prescribing computation. One or more embodiments of the invention may be stored on or in one or more mediums as object code. Instructions that may implement one or more embodiments of the invention may be executed by one or more processors. Portions of the invention may be in instructions that execute on one or more hardware components other than a processor.

Figure 7:
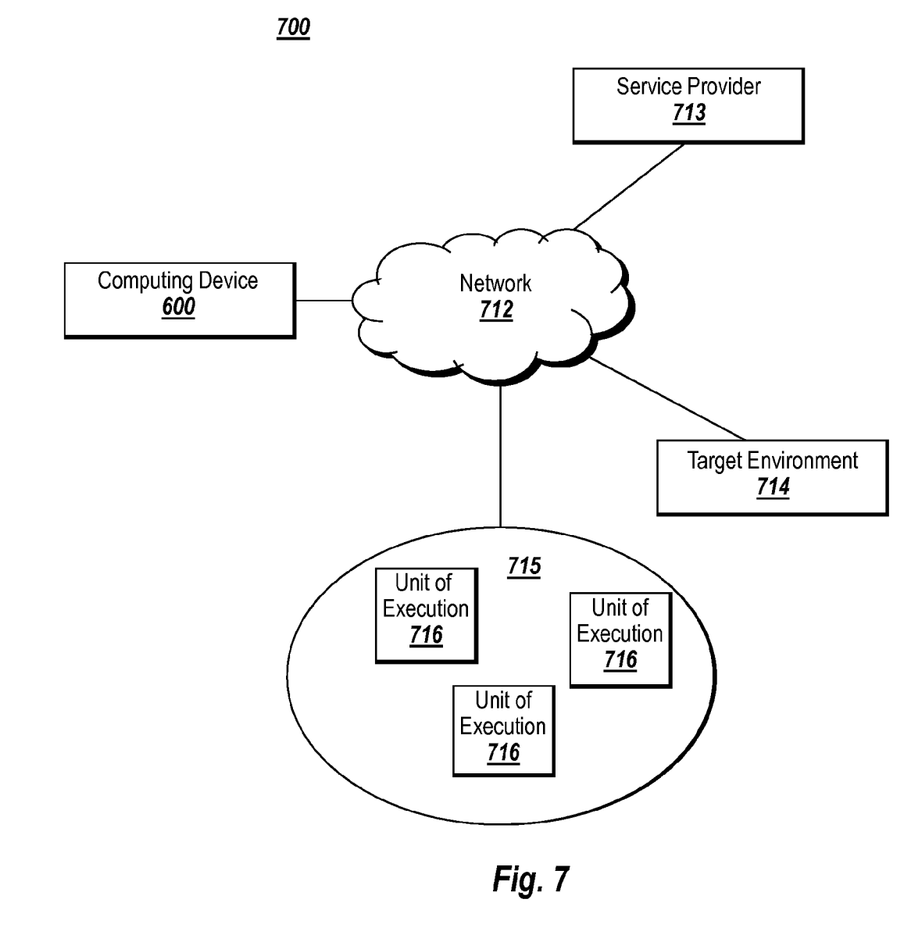
FIG. 7 is an exemplary network structure suitable for performing the methods described herein.

FIG. 7 depicts a network implementation that may implement one or more embodiments of the invention. A system 700 may include a computing device 600, a network 712, a service provider 713, a target environment 714, and a cluster 715. The embodiment of FIG. 7 is exemplary, and other embodiments can include more devices, fewer devices, or devices in arrangements that differ from the arrangement of FIG. 7.

The network 712 may transport data from a source to a destination. Embodiments of the network 712 may use network devices, such as routers, switches, firewalls, and/or servers (not shown) and connections (e.g., links) to transport data. 'Data,' as used herein, may refer to any type of machine-readable information having substantially any format that may be adapted for use in one or more networks and/or with one or more devices (e.g., the computing device 600, the service provider 713, etc.). Data may include digital information or analog information. Data may further be packetized and/or non-packetized.

The network 712 may be a hardwired network using wired conductors and/or optical fibers and/or may be a wireless network using free-space optical, radio frequency (RF), and/or acoustic transmission paths. In one implementation, the network 712 may be a substantially open public network, such as the Internet. In another implementation, the network 712 may be a more restricted network, such as a corporate virtual network. The network 712 may include Internet, intranet, Local Area Network (LAN), Wide Area Network (WAN), Metropolitan Area Network (MAN), wireless network (e.g., using IEEE 802.11, Bluetooth, etc.), etc. The network 712 may use middleware, such as Common Object Request Broker Architecture (CORBA) or Distributed Component Object Model (DCOM). Implementations of networks and/or devices operating on networks described herein are not limited to any particular data type, protocol, architecture/configuration, etc.

The service provider 713 may include a device that makes a service available to another device. For example, the service provider 713 may include an entity (e.g., an individual, a corporation, an educational institution, a government agency, etc.) that provides one or more services to a destination using a server and/or other devices. Services may include instructions that are executed by a destination to perform an operation (e.g., an optimization operation). Alternatively, a service may include instructions that are executed on behalf of a destination to perform an operation on the destination's behalf.

The target environment 714 may include a device that receives information over the network 712. For example, the target environment 714 may be a device that receives user input from the computer 600.

The cluster 715 may include a number of units of execution (UEs) 716 and may perform processing on behalf of the computer 600 and/or another device, such as the service provider 713. For example, the cluster 715 may perform parallel processing on an operation received from the computer 600. The cluster 715 may include UEs 716 that reside on a single device or chip or reside on a number of devices or chips.

The units of execution (UEs) 716 may include processing devices that perform operations on behalf of a device, such as a requesting device. A UE may be a microprocessor, field programmable gate array (FPGA), and/or another type of processing device. UE 716 may include code, such as code for an operating environment. For example, a UE may run a portion of an operating environment that pertains to parallel processing activities. The service provider 713 may operate the cluster 715 and may provide interactive optimization capabilities to the computer 600 on a subscription basis (e.g., via a web service).

Units of Execution (UEs) may provide remote/distributed processing capabilities for products such as MATLAB® from The MathWorks, Inc. A hardware unit of execution may include a device (e.g., a hardware resource) that may perform and/or participate in parallel programming activities. For example, a hardware unit of execution may perform and/or participate in parallel programming activities in response to a request and/or a task it has received (e.g., received directly or via a proxy). A hardware unit of execution may perform and/or participate in substantially any type of parallel programming (e.g., task, data, stream processing, etc.) using one or more devices. For example, a hardware unit of execution may include a single processing device that includes multiple cores or a number of processors. A hardware unit of execution may also be a programmable device, such as a field programmable gate array (FPGA), an application specific integrated circuit (ASIC), a digital signal processor (DSP), or other programmable device. Devices used in a hardware unit of execution may be arranged in many different configurations (or topologies), such as a grid, ring, star, or other configuration. A hardware unit of execution may support one or more threads (or processes) when performing processing operations.

A software unit of execution may include a software resource (e.g., a technical computing environment) that may perform and/or participate in one or more parallel programming activities. A software unit of execution may perform and/or participate in one or more parallel programming activities in response to a receipt of a program and/or one or more portions of the program. A software unit of execution may perform and/or participate in different types of parallel programming using one or more hardware units of execution. A software unit of execution may support one or more threads and/or processes when performing processing operations.

The term 'parallel programming' may be understood to include multiple types of parallel programming, e.g. task parallel programming, data parallel programming, and stream parallel programming. Parallel programming may include various types of processing that may be distributed across multiple resources (e.g., software units of execution, hardware units of execution, processors, microprocessors, clusters, labs) and may be performed at the same time.

For example, parallel programming may include task parallel programming where a number of tasks may be processed at the same time on a number of software units of execution. In task parallel programming, a task may be processed independently of other tasks executing, for example, at the same time.

Parallel programming may include data parallel programming, where data (e.g., a data set) may be parsed into a number of portions that may be executed in parallel using, for example, software units of execution. In data parallel programming, the software units of execution and/or the data portions may communicate with each other as processing progresses.

Parallel programming may include stream parallel programming (also referred to as pipeline parallel programming). Stream parallel programming may use a number of software units of execution arranged, for example, in series (e.g., a line) where a first software unit of execution may produce a first result that may be fed to a second software unit of execution that may produce a second result given the first result. Stream parallel programming may also include a state where task allocation may be expressed in a directed acyclic graph (DAG) or a cyclic graph.

Other parallel programming techniques may involve some combination of task, data, and/or stream parallel programming techniques alone or with other types of processing techniques to form hybrid-parallel programming techniques.

The foregoing description may provide illustration and description of various embodiments of the invention, but is not intended to be exhaustive or to limit the invention to the precise form disclosed. Modifications and variations may be possible in light of the above teachings or may be acquired from practice of the invention. For example, while a series of acts has been described above, the order of the acts may be modified in other implementations consistent with the principles of the invention. Further, non-dependent acts may be performed in parallel. Further, although features and accessing classes have been described above using particular syntaxes, features and accessing classes may equally be specified using in different ways and using different syntaxes.

In addition, one or more implementations consistent with principles of the invention may be implemented using one or more devices and/or configurations other than those illustrated in the Figures and described in the Specification without departing from the spirit of the invention. One or more devices and/or components may be added and/or removed from the implementations of the figures depending on specific deployments and/or applications. Also, one or more disclosed implementations may not be limited to a specific combination of hardware.

Furthermore, certain portions of the invention may be implemented as logic that may perform one or more functions. This logic may include hardware, such as hardwired logic, an application-specific integrated circuit, a field programmable gate array, a microprocessor, software, or a combination of hardware and software.

No element, act, or instruction used in the description of the invention should be construed critical or essential to the invention unless explicitly described as such. Also, as used herein, the article "a" is intended to include one or more items. Where only one item is intended, the term "a single" or similar language is used. Further, the phrase "based on," as used herein is intended to mean "based, at least in part, on" unless explicitly stated otherwise. In addition, the term "user", as used herein, is intended to be broadly interpreted to include, for example, a computing device (e.g., a workstation) or a user of a computing device, unless otherwise stated.

The scope of the invention is defined by the claims and their equivalents.

The invention claimed is:

1. A non-transitory computer-readable medium storing computer readable instructions for:
   creating a first object:
      the first object interacting with a first logging location in an arbitrary model,
      the first object including a first reference,
      the first object having a first counter,
      the first object creating a first vector having a first data point for the first object;
   creating a second object:
      the second object interacting with a second logging point in an arbitrary model,
      the second object including a second reference, and
      the second object having a counter for indexing into a vector;
   determining whether the second object shares at least the first data point of the data in the first vector with the first object;
   indexing the counter when the second object shares the first data point; and
   creating a second vector when the second object does not share the first data point.

2. The medium of claim 1, wherein the data is time data.

3. The medium of claim 1, wherein the first reference and the second reference are pointers to a vector.

4. The medium of claim 1, wherein the arbitrary model is a block diagram model of a dynamic system.

5. The medium of claim 1, wherein the first vector initially stores uniform data and is a compressed first vector.

6. The medium of claim 1, wherein:
   the first vector comprises at least N data points; and
   the medium further comprises instructions for:
      receiving a request that the second object logs an $N^{th}$ data point having a value V,
      indexing the counter to the value N, and
      determining whether the $N^{th}$ data point in the first vector has the value V, wherein:
         if the $N^{th}$ data point in the first vector has the value V, the first vector is shared with the second object, and
         if the $N^{th}$ data point in the first vector does not have the value V, the second vector is created having the first (N-1) data points from the first vector and the value V as an $N^{th}$ data point.

7. The medium of claim 1, wherein the data is streaming data in which data points become known during an execution of the arbitrary model.

8. A computer implemented method comprising:
   creating a first object:
      the first object interacting with a first logging location in an arbitrary model,
      the first object including a first reference,
      the first object having a first counter,
      the first object creating a first vector having a first data point for the first object;
   creating a second object:
      the second object interacting with a second logging point in an arbitrary model,
      the second object including a second reference, and
      the second object having a counter for indexing into a vector;
   determining whether the second object shares at least the first data point of the data in the first vector with the first object;
   indexing the counter when the second object shares the at least a portion of the data; and
   creating a second vector when the second object does not share the at least a portion of the data.

9. A system comprising:
   a storage for storing:
      a first object:
         the first object interacting with a first logging location in an arbitrary model,
         the first object including a first reference,
         the first object having a first counter,
         the first object creating a first vector having a first data point for the first object;
      a second object:
         the second object interacting with a second logging point in an arbitrary model,
         the second object including a second reference, and
         the second object having a counter for indexing into a vector; and
   a processor for:
      determining whether the second object shares at least the first data point of the data in the first vector with the first object;
      indexing the counter when the second object shares the at least a portion of the data; and
      creating a second vector when the second object does not share the at least a portion of the data.

10. A non-transitory computer-readable medium storing computer readable instructions for:
    monitoring a plurality of objects, the objects for logging data from a plurality of logging locations in a model;
    monitoring a plurality of log vectors, where the plurality of log vectors is fewer than the plurality of objects;
    receiving a logging request at one of the plurality of objects, the request being for a data point to be logged with data in one of the plurality of log vectors;
    determining whether the data point is in one of the plurality of log vectors; and
    sharing a log vector having the data point with the one of the plurality of objects at which the logging request was received.

11. A non-transitory computer-readable medium storing computer readable instructions for:

creating a plurality of logging objects, the plurality of logging objects:
    comprising a first logging object and a second logging object, and
    being exposed to an environment that generates information to be stored in a log;
creating one or more vectors, the one or more vectors:
    comprising a first vector, and
    storing the information;
accepting a request from the environment that the first logging object log a data point;
logging the data point in the first vector;
identifying that the first logging object can share the first vector with the second logging object; and
sharing the first vector with the second logging object.

12. The medium of claim 11, wherein:
the first logging object and the second logging object each comprise a pointer to one of the one or more vectors; and
sharing the first vector with the second logging object comprises causing the pointer of the second logging object to point to the first vector.

13. The medium of claim 11, wherein the medium further stores instructions for:
simulating a block diagram model, the block diagram model comprising one or more logging points;
receiving an instruction from one of the logging points to log information; and
logging the information in one of the one or more vectors.

14. The medium of claim 11, wherein the logging points are configured by a user.

15. The medium of claim 11, wherein the first vector initially stores uniform data and is a compressed first vector.

16. The medium of claim 15, wherein logging the data point in the first vector causes the stored uniform data to become non-uniform, and the medium further stores instructions for converting the compressed first vector into a non-compressed first vector.

17. The medium of claim 11, wherein the medium further stores instructions for specifying a maximum number of data points allowed for the first vector.

18. The medium of claim 17, wherein logging the data point in the first vector causes the first vector to exceed the maximum number of data points allowed for the first vector, and the medium further stores instructions for converting the first vector into a circular vector that logs the point using a circular buffer.

19. The medium of claim 11, wherein the plurality of logging objects are exposed to the environment through an Application Programming Interface (API).

20. The medium of claim 19, wherein the API specifies a function for logging a data point "d" using one of the logging objects.

21. The medium of claim 11, further storing instructions for identifying that the first logging object can share the first vector with the second logging object by comparing the first vector with a vector associated with the second logging object.

22. The medium of claim 11, wherein the data is time data.

23. A computer-implemented method comprising:
creating a plurality of logging objects, the plurality of logging objects:
    comprising a first logging object and a second logging object, and
    being exposed to an environment that generates information to be stored in a log;
creating one or more vectors, the one or more vectors:
    comprising a first vector, and
    storing the information;
accepting a request from the environment that the first logging object log a data point;
logging the data point in the first vector;
identifying that the first logging object can share the first vector with the second logging object; and
sharing the first vector with the second logging object.

24. A non-transitory computer-readable medium storing computer readable instructions for:
creating a first object:
    the first object interacting with a first logging location in a first arbitrary model,
    the first object including a first reference,
    the first object having a first counter,
    the first object creating a first vector having a first data point for the first object;
creating a second object:
    the second object interacting with a second logging point in a second arbitrary model,
    the second object including a second reference, and
    the second object having a counter for indexing into a vector;
determining whether the second object shares at least the first data point of the data in the first vector with the first object;
indexing the counter when the second object shares the first data point; and
creating a second vector when the second object does not share the first data point.

* * * * *